(12) United States Patent
Lamsfuss

(10) Patent No.: US 7,820,942 B1
(45) Date of Patent: Oct. 26, 2010

(54) AUTOMATIC LEVELING FIXTURE

(75) Inventor: Michael Lamsfuss, Crestwood, KY (US)

(73) Assignee: Hillerich & Bradsby Co., Louisville, KY (US)

( * ) Notice: Subject to any disclaimer, the term of this patent is extended or adjusted under 35 U.S.C. 154(b) by 287 days.

(21) Appl. No.: 10/813,452

(22) Filed: Mar. 30, 2004

(51) Int. Cl.
*B23K 26/02* (2006.01)

(52) U.S. Cl. .............................. 219/121.82; 219/121.68; 219/121.85

(58) Field of Classification Search ............ 219/121.82, 219/121.85, 121.68, 121.69, 121.6; 269/43, 269/254 CS, 86, 88, 295, 25; 29/281.1, 271
See application file for complete search history.

(56) References Cited

U.S. PATENT DOCUMENTS

| | | | | |
|---|---|---|---|---|
| 3,267,581 A * | 8/1966 | Bassoff | .................... | 33/501.18 |
| 3,404,859 A * | 10/1968 | Chapman | ................. | 248/184.1 |
| 3,694,044 A * | 9/1972 | Cummings | ................... | 312/71 |
| 3,820,773 A * | 6/1974 | Aizawa | ....................... | 269/32 |
| 3,842,957 A * | 10/1974 | Wilkin et al. | ............ | 400/118.1 |
| 3,892,739 A * | 7/1975 | Von Strandtmann et al. | .. | 544/49 |
| 3,899,162 A * | 8/1975 | Fischer | ......................... | 269/25 |
| 3,908,449 A * | 9/1975 | Zuber | ......................... | 73/857 |
| 4,445,678 A * | 5/1984 | George | ........................ | 269/88 |
| 4,821,393 A * | 4/1989 | Spigarelli | ..................... | 29/283 |
| 5,201,501 A * | 4/1993 | Fassler | ....................... | 269/32 |
| 5,458,330 A * | 10/1995 | Baum | ......................... | 473/567 |
| 5,905,566 A * | 5/1999 | Comulada et al. | ............. | 355/73 |
| 6,019,154 A * | 2/2000 | Ma et al. | ..................... | 156/580 |
| 6,083,333 A * | 7/2000 | Van Beers et al. | .......... | 156/73.1 |
| 6,124,565 A * | 9/2000 | Morishita et al. | ...... | 219/121.67 |
| 6,126,062 A * | 10/2000 | Evers et al. | ................. | 228/212 |
| 6,259,057 B1 * | 7/2001 | Lai | ........................ | 219/121.73 |
| 6,459,952 B1 * | 10/2002 | Dundorf | ..................... | 700/182 |
| 6,705,372 B2 * | 3/2004 | Sano et al. | ................... | 156/503 |
| 6,953,188 B2 * | 10/2005 | Siegel | ........................ | 269/266 |

* cited by examiner

*Primary Examiner*—M. Alexandra Elve
(74) *Attorney, Agent, or Firm*—James E. Cole; Middleton Reutlinger

(57) ABSTRACT

An automatic leveling fixture includes a base, at least one jaw slidably connected to the base, a base plate slidable relative to the base. The at least one jaw has a base plate camming surface engaging the base plate and causing the at least one jaw to move a preselected distance relative to a distance moved by the base plate.

23 Claims, 8 Drawing Sheets

AUTOMATIC LEVELING FIXTURE

CROSS REFERENCES TO RELATED APPLICATIONS

None.

STATEMENT REGARDING FEDERALLY SPONSORED RESEARCH OR DEVELOPLMENT

None.

REFERENCE TO SEQUENTIAL LISTINGS, ETC.

None

BACKGROUND

1. Field of the Invention

The present invention comprises a fixture for repeatedly positioning an object having an equilaterally shaped cross-section. More specifically, the present invention provides a fixture for baseball bats having an automatic leveling feature in order to position the bats at the same elevation for laser engraving baseball bats of differing diameter.

2. Description of the Related Art

One of the steps involved in manufacturing wooden baseball bats is to engrave the manufacturer's insignia, logos, or even personalize the barrel of the bats prior to finishing the manufacturing process. Engravings may be formed by heating a piece of metal defining the insignia and stamping or branding the insignia into the wooden barrel of the baseball bat. Alternatively, the insignia, logo, or personalization may be cut into the bat by a blade or other hardened metal cutting tool. In any event, these prior art methods are very labor intensive and alternative means of cutting the barrel of a bat were developed.

Currently one method of engraving which manufacturers are utilizing is through the use of lasers. The lasers are typically in a fixed positioned above the baseball bat and are aimed at the barrel while the bats are held in position by clamps or fixtures. As this technology has emerged, another problem has developed. As one skilled in the art is well aware, various types of baseball bats are formed having different weights and sizes and as a result have varying diameters. For example, children's bats are often small while college and professional bats are longer and heavier. Further, souvenir bats are also available which are smaller than children's bats. However, the lasers must always be positioned at the fixed distance from the upper surface of the baseball bat, regardless of the diameter, so that the laser stays properly focused for cutting. Since the baseball bats have varying diameters, the laser must continually be focused to a proper distance when bats of varying diameter are utilized. Manually focusing the laser for each personalized bat substantially slows the manufacturing time and reduces output for bat manufacturers.

However, heretofore none of the known clamps or bat fixtures compensate for the varying diameters typical with engraving a plurality of bat sizes. Therefore, manufacturers must continually stop engraving to adjust clamps or fixtures for differing bat sizes in order to re-focus the cutting lasers.

SUMMARY OF THE INVENTION

With regard to the foregoing, the present invention eliminates the oversights, difficulties, and disadvantages of the prior art by providing a bat fixture.

It is an object of the present invention to provide an automatic leveling bat fixture for laser engraving.

It is a further object of the present invention to provide an automatic leveling bat fixture which accepts baseball bats of differing diameters.

It is still a further object of the present invention to provide an automatic leveling bat fixture which repeatedly positions bats of differing diameter at the same elevation.

An automatic leveling bat fixture, comprising a base, at least one jaw slidably adjustable relative to the base, a base plate slidably adjustable relative to the base and the at least one jaw, the at least one jaw having a base plate camming surface engaging the base plate causing the at least one jaw to move a preselected distance relative to a distance moved by the base plate. The at least one jaw comprises a first jaw and a second jaw which each move one-half the distance moved by the base plate. The automatic leveling bat fixture further comprises a jaw channel extending through the base in a latitudinal direction wherein the at least one jaw slides relative to the base through the jaw channel. The jaw channel has a rail positioned therein. The at least one jaw may be two opposed jaws biased inwardly toward the base plate. The opposed jaws may be biased by a compression spring extending through the opposed jaws and the opposed jaws being mounted on a rail and slidable relative to the base. The at least one jaw includes a tapered receiving surface providing a lateral force component. The automatic bat leveling fixture further comprises camming rollers mounted within a notch of the base plate and slidably engaging a base plate camming surface. The automatic leveling bat fixture receives bats of differing diameter and positions the bats at equivalent elevations relative to a laser.

DETAILED DESCRIPTION

Given the foregoing deficiencies, it will be appreciated that a bat fixture is needed allowing placement repeated placement of bats of different diameter at the same elevation relative to an engraving laser or marking device. For purpose of this description, a baseball bat is shown and described as being held in place by the fixture of the present invention, however it should be understood that the fixture may be used to retain a plurality of objects having an equilateral cross-section.

Referring now in detail to the drawings, wherein like numerals indicate like elements throughout the several views, there is shown in FIGS. 1-8 various aspects of an automatic leveling bat fixture 10. The automatic leveling bat fixture 10 provides a clamping or retaining device which positions bats of differing diameters at the same elevation relative to a laser 11.

Figure 1:
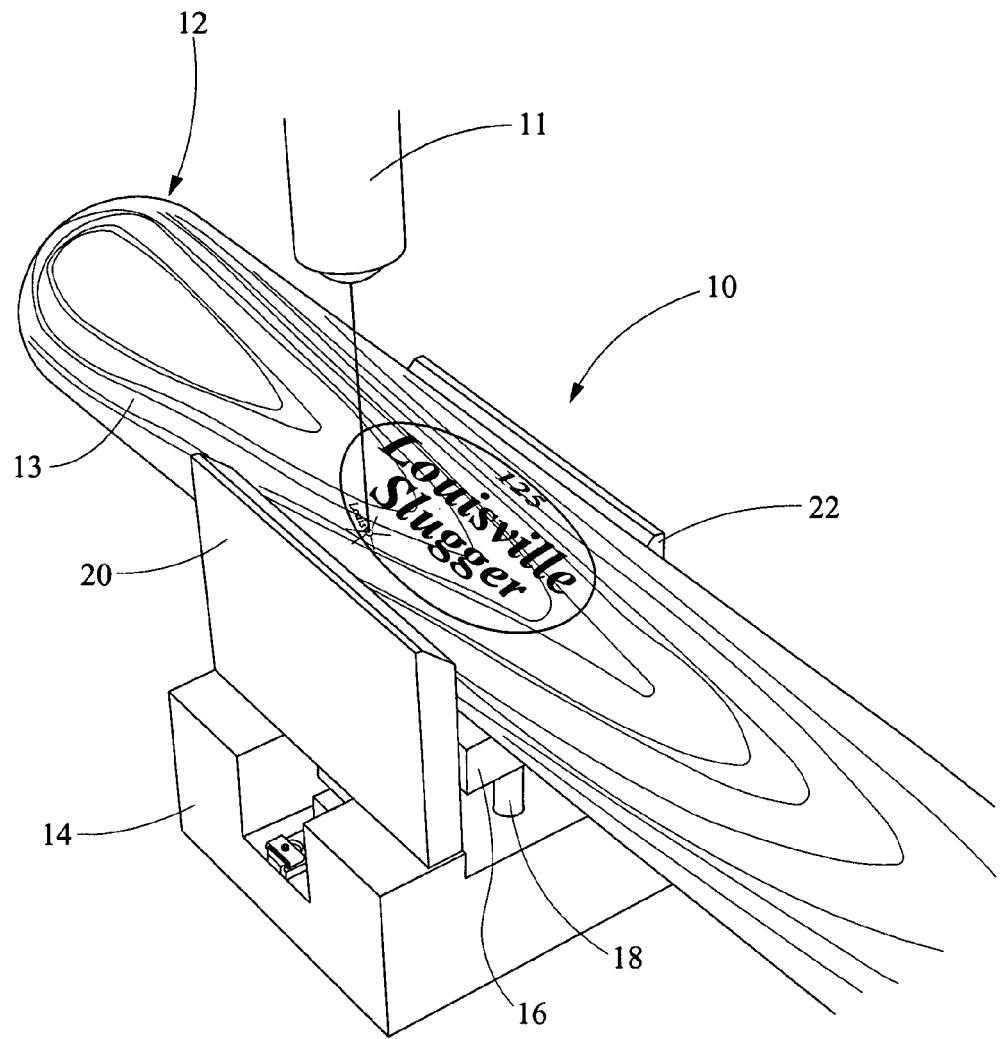
FIG. 1 is a perspective view of a automatic leveling bat fixture clamp of the present invention for retaining a baseball bat therein.

Referring initially to FIG. 1, a perspective view of the automatic leveling bat fixture 10 and baseball bat 12 positioned within the automatic leveling bat fixture 10 for laser engraving of the bat barrel 13 is shown. In order to insure proper engraving, a laser 11 must be held at the same distance from the bat in a repeatable manner regardless of the diameter of the bat 12. Thus, it is preferable to not move the laser 11 between bat changes but not absolutely necessary. The bat 12 must be repeatedly held at the same distance the automatic leveling bat fixture 10 comprises a base 14, a base plate 16, a first jaw 20, and a second jaw 22. The first jaw 20 and the second jaw 22 are biased inwardly toward the base plate 16 and spread away from one another as the bat 12 is interposed between the first and second jaws 20, 22 and against the base plate 16. The illustrative embodiment of the present invention repeatedly positions a plurality of bats at the same elevation regardless of the bat diameter, to insure proper laser focus and engraving.

Figure 2:
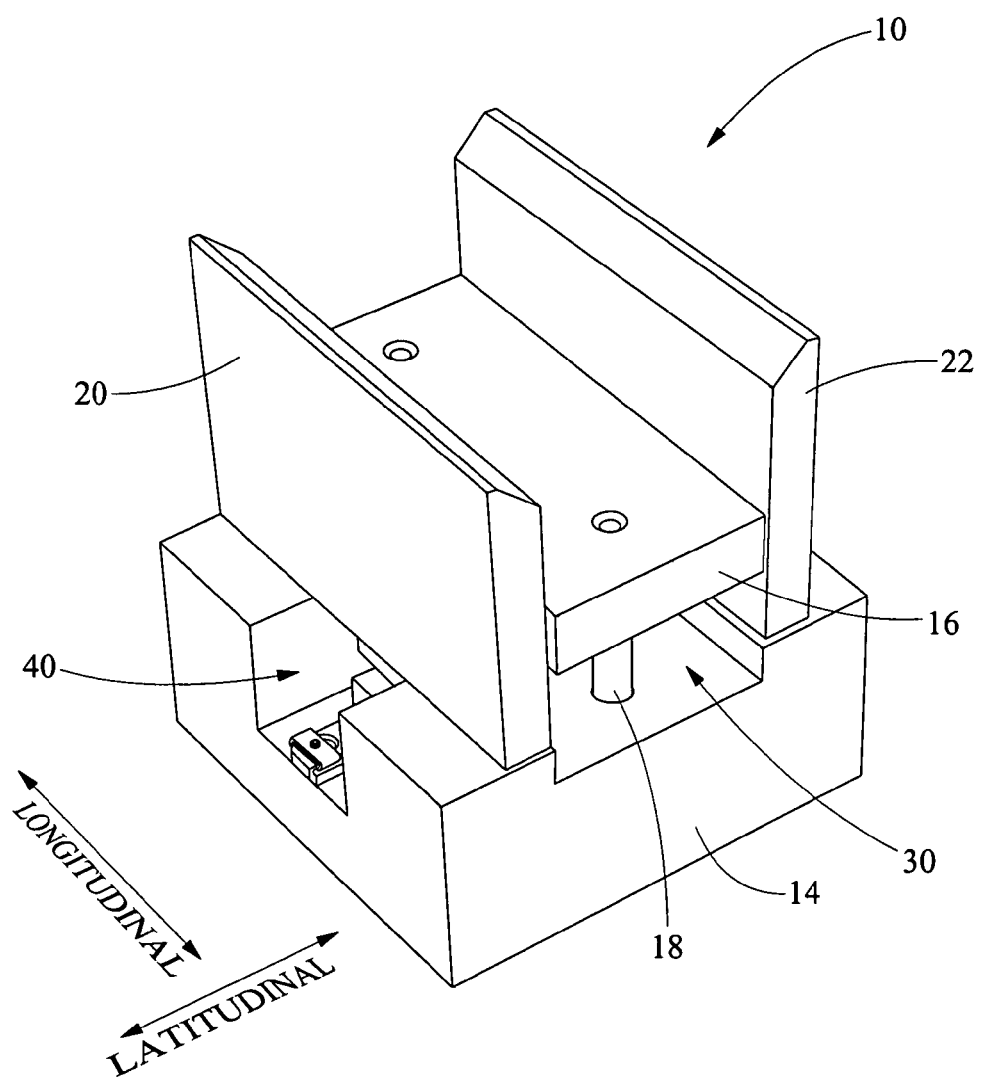
FIG. 2 is a perspective view of the automatic leveling bat fixture of FIG. 1 shown without the bat.

Referring now to FIG. 2, a perspective view of the automatic leveling bat fixture 10 is shown without the bat positioned between the first jaw 20 and second jaw 22 for purpose of clarity. As depicted, the first and second jaws 20, 22 are normally biased and positioned against the base plate 16 causing the base plate to be normally positioned some distance above an upper surface of a longitudinal jaw channel 40 extending across the base 14. For purposes of this invention description, two directions will be defined by channels extending through the base 14.

Figure 3:
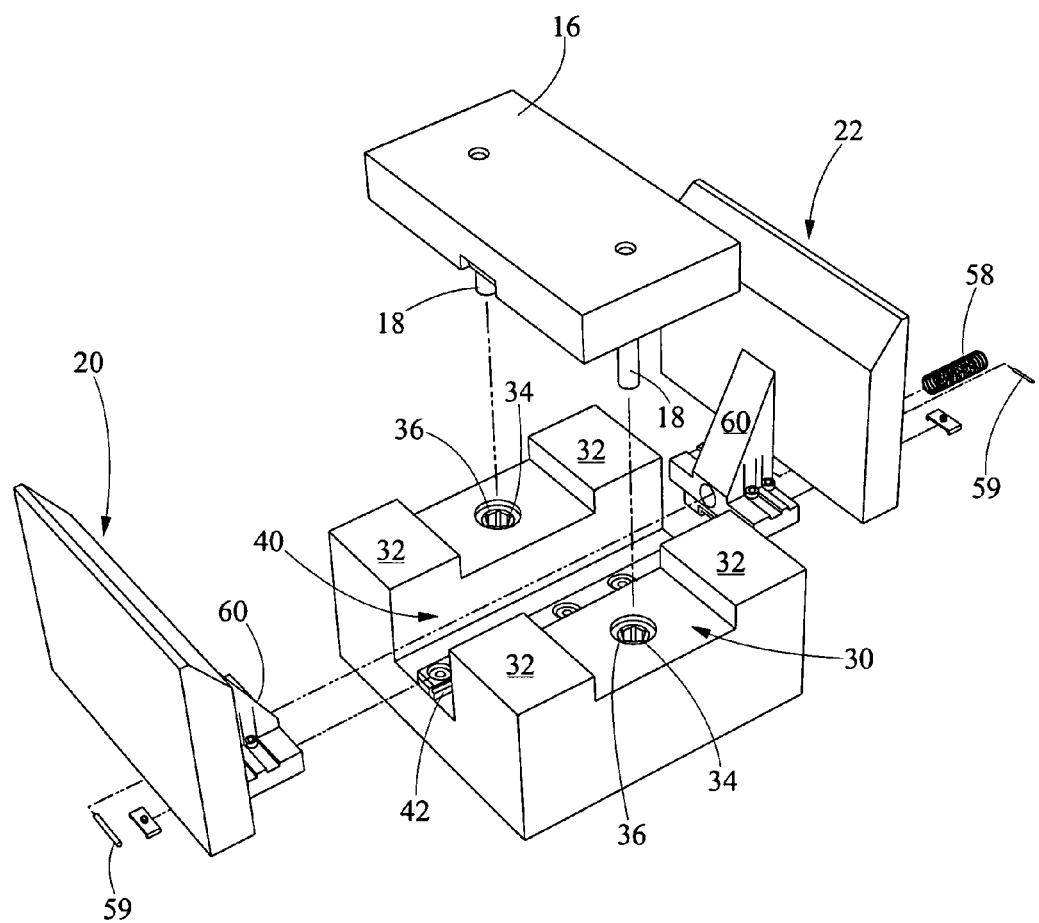
FIG. 3 is an exploded perspective view of the automatic leveling bat fixture of FIG. 2.
Figure 6:
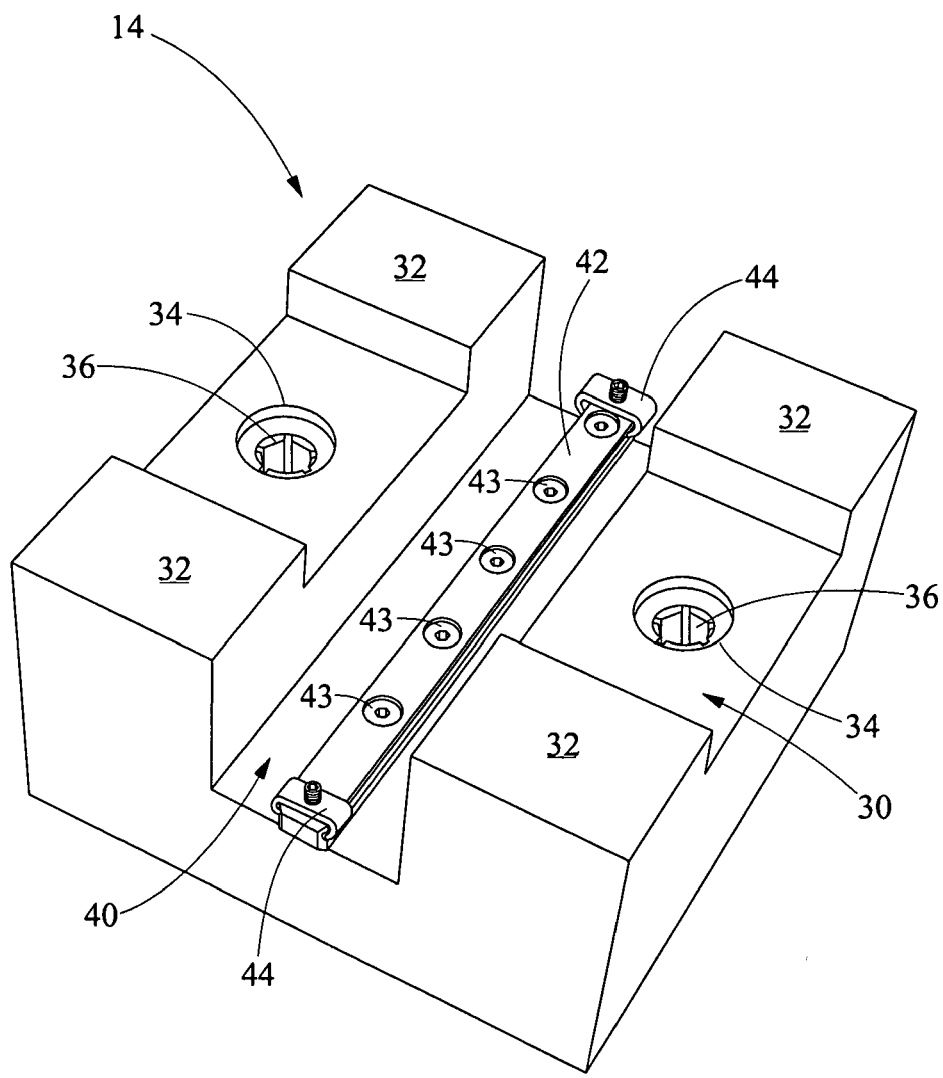
FIG. 6 is a perspective view of a base of the automatic leveling bat fixture of FIG. 1.

Referring now to FIGS. 2, 3, and 6 various aspects of the base 14 of the automatic leveling bat fixture 10 are shown and depict longitudinal and latitudinal channels extending there through. For purposes of the present description, a longitudinal direction will be defined by an upper base plate channel 30 extending across the upper portion of base 14 which is parallel to the major axis of base plate 16 and wherein the base plate 16 may be seated when the base plate 16 is fully positioned downward against the base 14. Alternatively, a latitudinal direction is defined by a second channel extending through the base 14 and which is generally deeper than the longitudinal base plate channel and substantially orthogonal to the upper longitudinal channel extending through base 14. The base 14 is may be substantially cubical in shape defined by four sides, and an upper and a lower surface. However the shape of the base need not be square and may be defined by a plurality of geometries not specifically shown herein. The base 14 may alternatively be described as two U-shaped bodies perpendicularly extruded and intersecting wherein one U-shaped body is deeper than the other U-shaped body. The base 14 further comprises an upper base plate channel 30 extending across the upper portion of the base in a longitudinal direction as previously defined from one side of the base 14 to an opposed side. The base plate channel 30 defines four plateaus 32 at four upper corner positions of the base 14 which act as sliding surfaces for the jaws 20,22 described further hereinafter. Within the lower surfaces of the base plate channel 30 are sleeve apertures 34 which are vertically oriented and extending downwardly through the base 14. Within the sleeve apertures 34 are sleeves 36 which may be linear bearings or other friction reducing elements to provide for smooth vertical movement of the base plate 16 upwardly and downwardly through the sleeves 36 and which will also be described further hereinafter.

Extending through the base 14 in a substantially latitudinal direction perpendicular to the base plate channel 30 is a jaw channel 40 which is deeper than the base plate channel 30 and also defines the plateaus 32 formed by channel 30. The jaw channel 40 extends from a first end of the base 14 to a second end of the base 14 and defines a position for a rail 42. The rail 42 is fastened to the lower surface of jaw channel 40 by a plurality of fasteners 43 however it is well within the scope of the present invention that the rail 42 may be affixed with some fixative or other fastening or retaining device. Located at opposed ends of the rail 42 are stops 44 which are fastened to the rail 42. The stops 44 inhibit removal of the first and second jaws 20, 22 once the jaws are slideably positioned on the rail 42.

Figure 5:
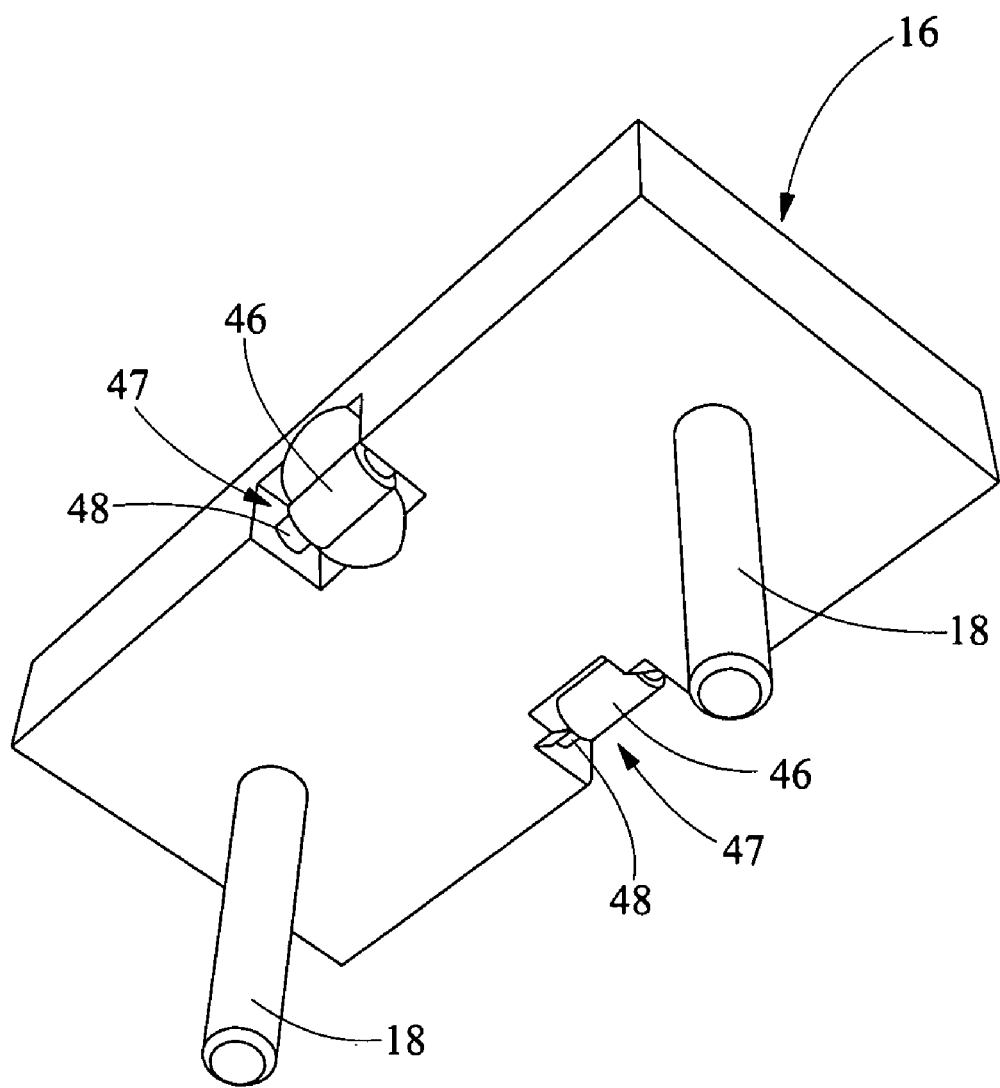
FIG. 5 is a lower perspective view of a base plate and guide posts of the automatic leveling bat fixture of FIG. 1.

Referring now to FIG. 3 and FIG. 5, which depicts the base plate 16 in a lower perspective view, the base plate 16 is shown being substantially parallelogram in shape, and more specifically having a substantially rectangular shape defined by an upper surface, a lower surface, and four side surfaces extending between the upper and lower surfaces. However, the base plate 16 may include a plurality of shapes preferably having opposed parallel sides for engagement with first and second jaws 20,22. Depending from the lower surface of the base plate 16 are guideposts 18 which are substantially cylindrical or columnar in shape. Alternatively, the guideposts 18 may have different shapes as dictated by, and corresponding to, the sleeve apertures 34 and sleeves 36. The lower ends of the guideposts 18 may have a slight taper or be rounded and are spaced apart a distance corresponding to the center distance between the sleeve apertures 34 in the base 14. Thus, as one of ordinary skill in the art may understand, the tapered or rounded end of guideposts 18 facilitates feeding of the guideposts into the sleeves 16 and the linear bearings defining the sleeve 36 allow smooth movement of the guideposts 18 into and within the base 14. Optionally, the guide posts 18 may include a catch, not shown, to inhibit removal of the base plate 16 from the base 14 once installed.

Along the outer edge of the longer sides of the base plate 16 and centrally positioned along the longer sides of the base plate 16 are camming rollers 46 which are positioned on roller axes 48. A notch 47 is formed along a central portion of the longer sides of the base plate 16. The notch 47 provides for positioning of the camming roller within the profile of the base plate 16. The camming rollers 46 function to engage camming surfaces 60 on the first and second jaws 20, 22 in order to cause the base plate 16 to rise or fall corresponding to movement of the first and second jaws 20, 22 into and out of the jaw channel 40.

Figure 4:
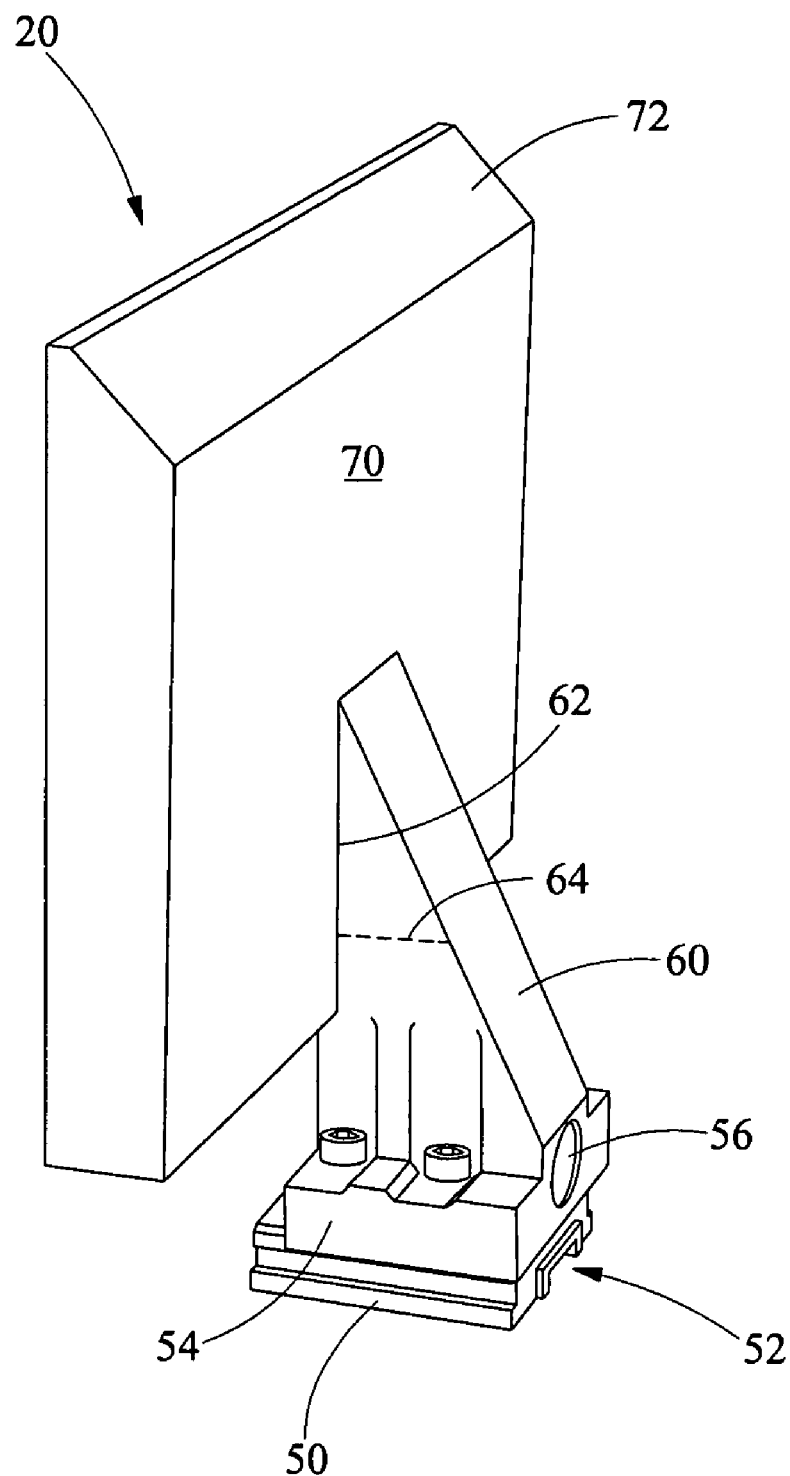
FIG. 4 is a side perspective view of a jaw of the fixture clamp of FIG. 1.
Figure 7:
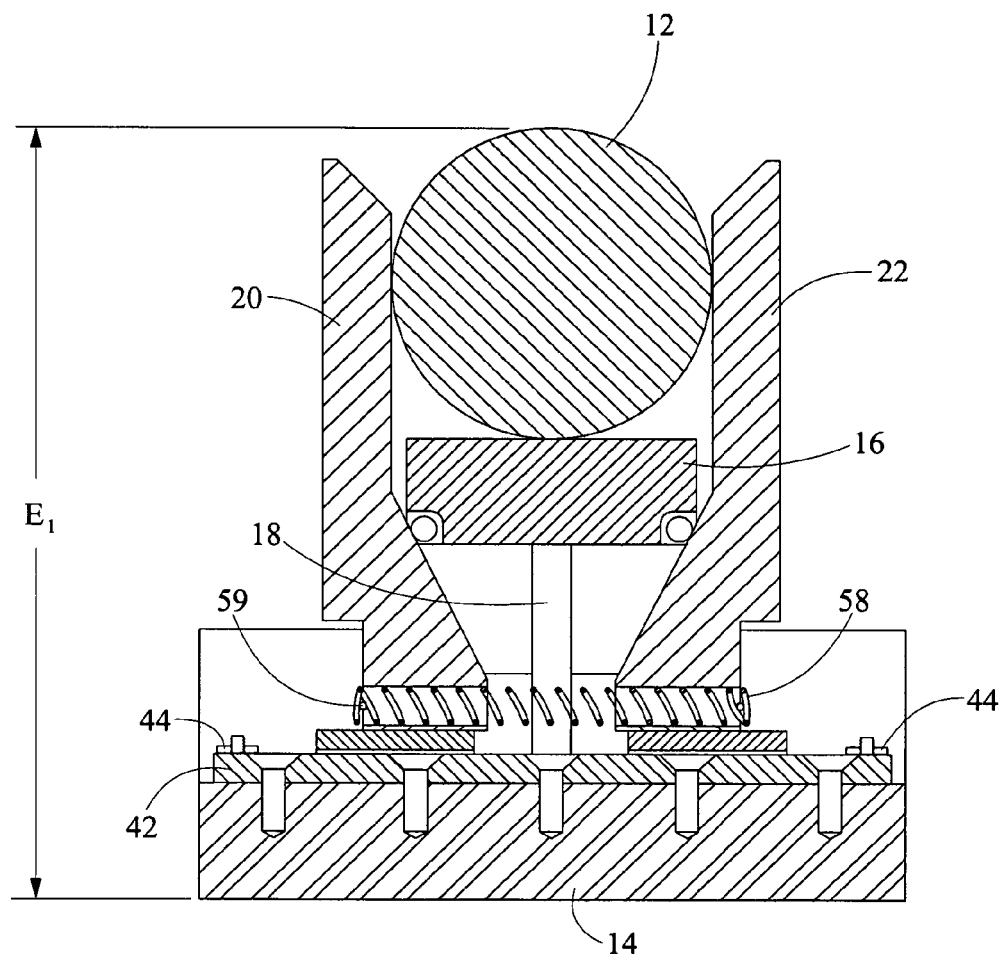
FIG. 7 is a side sectional view of the automatic leveling bat fixture of FIG. 1 including a bat positioned therein; and, FIG. 8 is a side sectional view of the automatic leveling bat fixture of FIG. 7 including a second bat of a second diameter.
Figure 8:
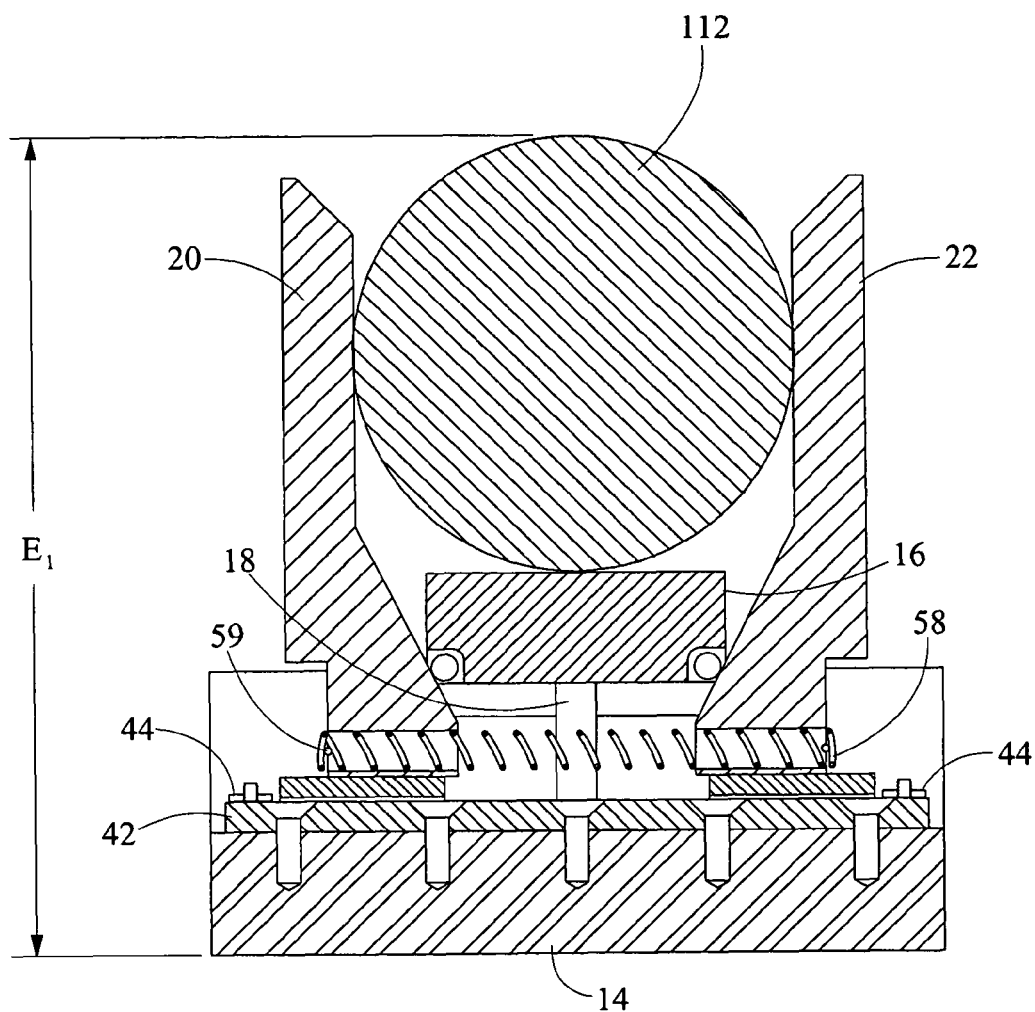

Referring now to FIG. 4, the first jaw 20 is shown in perspective view and is illustrative of both the first jaw 20 and the second jaw 22. The jaw 20 has a sled or jaw guide 50 located at a bottom portion of the jaw 20 which engages the rail 42 by receiving the cross-section of the rail 42. More specifically, a rail channel 52 centrally positioned in the sled 50 and extending there through provides a connection allowing slidable positioning of the sled 50 and jaws 20,22 along the rail 42 and relative to the base 14. In other words, the sled 50 allows movement in a latitudinal direction through the jaw channel 40. The sled 50 or rail 42 may include linear bearings to inhibit binding and provide smooth motion of the sled 50 along the rail 42. Positioned above the jaw guide or sled 50 is a platform 54 having a spring housing 56 extending horizontally through the platform 54 in a latitudinal direction as depicted in FIGS. 2, 3. As shown in FIGS. 3, 7 and 8 a compression coil spring 58 provides a biasing force on the first and second jaws 20, 22 in order to pull the jaws 20, 22 inwardly in a latitudinal direction against the base plate 16.

The compression coil spring 58 is held in place by a retaining pins 59 at each end of the coil spring 58 and against outer surfaces of the platform 54 to bias the jaws 20, 22 latitudinally inwardly against the base plate 16.

Extending upwardly from the platform 54 at a preselected angle is the base plate camming surface 60. The camming surface 60 defines the hypotenuse of a right triangle wherein the horizontal leg 64 of the right triangle is one-half the length of the vertical leg 62 of the right triangle. In other words, the ratio of rise-to-run defined by the base plate camming surface 60 is 2-to-1 (2/1).

Referring briefly to FIGS. 7 and 8, the camming rollers 46 engage the base plate camming surfaces 60 of the first and second jaws 20, 22 so that as the base plate 16 moves downwardly, for instance when a bat is placed thereon, the jaws 20, 22 move a corresponding distance through the jaw channel 40 along rail 42. Oppositely, when the jaws 20, 22 move inwardly, the base plate 16 moves upwardly along the base plate camming surface 60. More specifically, the angle of the camming surface 60 provides that each jaw 20, 22 moves inwardly or outwardly in a latitudinal direction one-half of the vertical distance moved by the base plate 16. Otherwise stated, for each half unit that each jaw 20,22 moves, the base plate 16 moves a full unit. Stated in yet a another manner, the base plate 16 moves a distance equal to the total displacement of both jaws 20,22. This geometry provides that bats of differing diameter may be positioned in the fixture 10 and always be positioned at the same height.

Extending from a rear portion of the base plate camming surface 60, and more specifically the vertical leg of the triangle defining the base plate camming surface 60, is a jaw plate 70. The jaw plate 70 may be integrally formed with the jaw 20,22 or may be fastened or otherwise affixed thereto. The jaw plate 70 may be defined by a plurality of various shapes and is substantially rectangular in shape as shown in the present illustrative embodiment having a planar vertical surface normally disposed against the base plate 16. At an upper portion of the jaw plate 70 is a tapered receiving surface 72 which guides the bat into the open area between the opposed first and second jaws 20, 22 and above base plate 16. Further, the tapered receiving surface 72 creates a lateral force component on the jaws 20, 22 when a vertical force is placed on the jaws 20, 22 by the downward motion of a bat 12 being positioned in the automatic leveling bat fixture 10. The lateral force component opposes the spring bias on jaws 20,22 causing the jaws 20,22 to spread apart in a latitudinal direction through jaw channel 40 in order to accommodate bats of different diameter and repeatedly position the bats at the same elevation. The jaw plate 70 engages a tangent point on the outer surface of the bat 12 when the bat is placed in the automatic leveling bat fixture 10 as shown in FIG. 1.

Referring now to FIGS. 7 and 8, side-sectional views of the automatic leveling bat fixture 10 are shown being utilized with two bats of different diameters in order to show that the automatic leveling bat fixture 10 repeatedly positions bats of different diameters at the same elevation relative to a laser 11 above the bat and automatic leveling bat fixture 10. As shown in FIG. 7, a bat 12 having a first diameter is placed between the first and second jaws 20, 22 and has tangential contact with the opposed jaw plates 70. The bat 12 also contacts the base plate 16 causing the first and second jaws 20, 22 to spread apart in a latitudinal direction and against the biasing force of the compression spring 58 as shown by the gap between the edges of the base plate 16 and the jaw plate 70. In other words, the bat 12 is positioned within the automatic leveling bat fixture 10 so that the bat 12 has tangential contact with the base plate 16 and first and second jaws 20, 22. When the first and second jaws 20, 22 and the base plate 16 are all in tangential contact with the bat 12, the bat 12 is positioned at an elevation $E_1$ defined from the bottom of the base 14 to the top surface of the bat 12. Referring now to FIG. 8, a second bat 112 is placed in the automatic leveling bat fixture 10 and has a second diameter greater than the diameter of the bat 12 previously shown and described in FIG. 7. As previously indicated, when the second bat 112 is in tangential contact with the first jaw 20, the second jaw 22, and the base plate 16, the jaws 20, 22 are spread apart a distance greater than that shown in FIG. 7 as indicated by the gap between the base plate 16 and the first and second jaws 20, 22 respectively. However, the elevation of the top surface of the bat is labeled $E_1$ as depicted and shown in FIG. 7, and therefore is equal to the elevation $E_1$ shown in FIG. 7 despite the fact that the second bat 112 has a diameter which is larger than the bat 12 of FIG. 7.

In operation, a bat 12 is positioned against the tapered receiving surface 72 and pushed downwardly against the inward bias on the jaws 20,22. As discussed, the tapered surface 72 in combination with the downward force provides a lateral component force moving the jaws 20,22 outwardly against the spring bias. The bat 12 continues downwardly against the jaws 20,22 sliding along the jaw plate 70 until the bat 12 engages the base plate 16. Over pushing of the bat 12 will result in the bat 12 losing contact with the jaw plates 70 as they move outwardly and the base plate 16 moves downward. Removal of the downward force results in the bias force compressing the jaws 20,22 against the bat 20 at which time the base plate 16 will rise as the plates 70 move inwardly in a latitudinal direction. When the fixture mechanically equalizes, the bat 12 will be in tangential contact with the base plate 16 and jaws 20,22. At this time, the laser 11 may begin engraving. Once the bat is removed from the automatic leveling bat fixture 10, the compression spring 58 biases the jaws 20,22 back together in a latitudinal direction through jaw channel 40 such that the jaw plate 70 is positioned against the base plate 16 and is therefore ready to accept a subsequent bat 12 for engraving.

I claim:

1. A combination automatic leveling fixture and bat, comprising:
    a base;
    at least one jaw being slidably connected to said base;
    a base plate being slidable relative to said base, said base plate sliding in a substantially vertical direction which is substantially perpendicular to said at least one slidable jaw;
    said at least one jaw having an angled base plate camming surface which engages said base plate and causes said at least one jaw to move a preselected distance relative to a distance moved by said base plate;
    camming rollers mounted within a notch of said base plate and slidably engaging said angled base plate camming surface of said at least one jaw;
    said bat engaging said at least one jaw and said base plate when said leveling fixture moves said bat to a preselected position.

2. The automatic leveling fixture of claim 1, said at least one jaw being a first jaw and a second jaw.

3. The automatic leveling fixture of claim 2, said first jaw and said second jaw each moving one-half the distance moved by said base plate.

4. The automatic leveling fixture of claim 1, further comprising a jaw channel extending through said base in a latitudinal direction.

5. The automatic leveling fixture of claim 4, said at least one jaw sliding relative to said base through said jaw channel.

6. The automatic leveling fixture of claim 5, said jaw channel having a rail positioned therein.

7. The automatic leveling fixture of claim 1, said at least one jaw being two opposed jaws.

8. The automatic leveling fixture of claim 7, said two opposed jaws being biased inwardly toward said base plate.

9. The automatic leveling fixture of claim 8, said two opposed jaws being biased by a compression spring extending through said opposed jaws.

10. The automatic leveling fixture of claim 9, said two opposed jaws being mounted on a rail and slidable relative to said base.

11. The automatic leveling fixture of claim 1, said at least one jaw having a tapered receiving surface.

12. The automatic leveling fixture of claim 1, said fixture receiving bats of varying diameter and position said bats at equal elevations relative to a laser.

13. A combination automatic leveling fixture and a bat, comprising:
  a base plate slidably positioned in a base, said base plate having at least one guide post slidably engaging said base through an aperture in said base;
  a first jaw and a second jaw slidably adjustable relative to said base;
  said first jaw and said second jaw slidable in a lateral direction which is non-parallel to a substantially vertical sliding motion of said base plate;
  said first jaw and said second jaw biased toward said base plate;
  said first jaw and said second jaw each having a base plate camming surface extending toward said base plate for directing said base plate a preselected distance dependent upon movement of said jaws;
  said bat leveled by engagement of said bat with said first jaw, said second jaw and said base plate.

14. The automatic leveling fixture of claim 13, said first jaw, said second jaw, and said base plate each having tangential contact with said bat placed in said automatic leveling fixture.

15. The automatic leveling fixture of claim 13, said first jaw and said second jaw each moving one-half of a distance moved by said base plate.

16. The automatic leveling fixture of claim 13, said base plate camming surface having a rise-to-run ratio of 2-to-1.

17. The automatic leveling fixture of claim 13, said fixture capable of receiving various bats of varying diameter and repeatably positioning a peripheral edge of each of said bats at a preselected elevation.

18. An automatic leveling fixture, comprising:
  a base;
  at least one jaw;
  at least one base plate sliding a distance in a first vertical direction dependent upon a distance moved in a second substantially transverse direction by said at least one jaw;
  said at least one base plate having at least one guide post slidably engaging said base through an aperture in said base;
  an angled camming surface operably engaging said base plate and said at least one jaw;
  a bat engaged by said at least one base plate and said at least one jaw;
  wherein said fixture retains bats of varying diameter at equal elevations regardless of the bat diameter.

19. An automatic leveling fixture, comprising:
  a base;
  a least one jaw slidable in a horizontal plane;
  a base plate slidable in a vertical plane a distance relative to said sliding of said at least one jaw;
  an angled camming surface extending between said at least one jaw and said base plate providing motion of said base plate dependent upon a distance moved by said at least one jaw and wherein said base plate is movable relative to said base, said at least one slidable jaw and said angled camming surface;
  camming rollers engaging each of said angled camming surface;
  said automatic leveling fixture controlling lateral positioning and height of a bat in a repeatable manner regardless of the diameter of a bat.

20. An automatic leveling fixture, comprising:
  a slidable base plate in contact with a bat;
  said slidable base plate having at least one guide post slidably engaging a base through an aperture in said base;
  a first and second slidable jaw in contact with opposite sides of said bat;
  wherein said first and second jaws are in slidable contact with said slidable base plate, said base plate moveable in a first substantially vertical direction which is substantially transverse to a second lateral direction of said first and second slidable jaw;
  a marking device adjacent said bat;
  wherein said first and second jaw slidably receive said bat and cause said slidable base plate to modify the vertical position of said bat to maintain an equal distance of said bat to said marking device regardless of said bat diameter.

21. A combination assembly including an automatic leveling fixture and at least one bat, comprising:
  a fixture apparatus which repeatedly positions bats of various diameters at a preselected elevation, wherein a peripheral edge of any one of said bats has an equilateral cross-section;
  said fixture comprising a pair of slidable jaws, a camming surface extending from each of said pair of slidable jaws, a base plate slidable vertically toward or away from a fixture base along said camming surface, camming rollers disposed between said engaging each of said camming surface;
  said base plate being slidable a first distance dependent on a second distance moved by said camming surface and said pair of jaws;
  said fixture apparatus further repeatedly positioning a center point of each of said bats at a preselected longitudinal and latitudinal position.

22. An automatic leveling fixture, comprising:
  a base;
  opposed jaws slidably connected to said base;
  a slidable base plate being slidable relative to said base and said opposed jaws;
  said slidable base plate having at least one guide post slidably engaging a base through an aperture in said base;
  said slidable base plate being slidable in a first substantially vertical direction and said opposed jaws being slidable in a second lateral direction;
  a base plate camming surface extending from said opposed jaws and engaging said movable base plate causing said jaws to move a preselected distance dependent on a distance moved by said slidable base plate.

23. A combination automatic leveling fixture and a bat, comprising:
- a base plate slidably positioned in a base;
- a first jaw and a second jaw slidably adjustable relative to said base;
- said first jaw and said second jaw slidable in a lateral direction which is non-parallel to a substantially vertical sliding motion of said base plate;
- said first jaw and said second jaw biased toward said base plate;
- said first jaw and said second jaw each having a base plate camming surface extending toward said base plate for directing said base plate a preselected distance dependent upon movement of said jaws;
- camming rollers engaging each of said base plate camming surface;
- said bat leveled by engagement of said bat with said first jaw, said second jaw and said base plate.

* * * * *